United States Patent
Sato

(10) Patent No.: US 10,887,530 B2
(45) Date of Patent: Jan. 5, 2021

(54) SIGNAL PROCESSING APPARATUS, IMAGING PICKUP APPARATUS, AND SIGNAL PROCESSING METHOD

(71) Applicant: SONY CORPORATION, Tokyo (JP)

(72) Inventor: Yasushi Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 199 days.

(21) Appl. No.: 16/080,912

(22) PCT Filed: Jan. 23, 2017

(86) PCT No.: PCT/JP2017/002081
§ 371 (c)(1),
(2) Date: Jan. 9, 2019

(87) PCT Pub. No.: WO2017/159041
PCT Pub. Date: Sep. 21, 2017

(65) Prior Publication Data
US 2019/0124271 A1 Apr. 25, 2019

(30) Foreign Application Priority Data
Mar. 14, 2016 (JP) ................... 2016-050084

(51) Int. Cl.
*H04N 5/33* (2006.01)
*H04N 5/265* (2006.01)
(Continued)

(52) U.S. Cl.
CPC ............ *H04N 5/265* (2013.01); *H04N 5/217* (2013.01); *H04N 9/04515* (2018.08); *H04N 9/04553* (2018.08)

(58) Field of Classification Search
USPC ........................................ 348/164
See application file for complete search history.

(56) References Cited

U.S. PATENT DOCUMENTS 9,113,096 B1* 8/2015 Azuma ............... H04N 5/369
9,232,151 B1* 1/2016 Azuma ............... H04N 5/2258
(Continued)

FOREIGN PATENT DOCUMENTS

CN 103929628 A 7/2014
JP 2004-229034 A 8/2004
(Continued)

OTHER PUBLICATIONS

International Search Report and Written Opinion of PCT Application No. PCT/JP2017/002081, dated Apr. 18, 2017, 05 pages of English Translation and 05 pages of ISRWO.
(Continued)

*Primary Examiner* — Nigar Chowdhury
(74) *Attorney, Agent, or Firm* — Chip Law Group

(57) ABSTRACT

To prevent deterioration in image quality in mixing a visible light signal and an infrared light signal to generate a color image signal. A signal processing device includes a mixture ratio creator and a mixer. The mixture ratio creator is configured to create a mixture ratio that is a ratio in mixing a low frequency visible light signal that is a low frequency component of a visible light signal and a low frequency invisible light signal that is a low frequency component of an invisible light signal together on a basis of the low frequency visible light signal and the low frequency invisible light signal. The mixer is configured to mix the low frequency visible light signal and the low frequency invisible light signal together on a basis of the mixture ratio to generate a mixed signal.

16 Claims, 15 Drawing Sheets

(51) Int. Cl.
*H04N 9/04* (2006.01)
*H04N 5/217* (2011.01)

(56) References Cited

U.S. PATENT DOCUMENTS

| | | | |
|---|---|---|---|
| 2012/0237079 A1* | 9/2012 | Hanyu | H04N 1/32203 382/100 |
| 2013/0208117 A1* | 8/2013 | Kamon | H04N 9/04559 348/148 |
| 2014/0192202 A1 | 7/2014 | Sang et al. | |

FOREIGN PATENT DOCUMENTS

| | | |
|---|---|---|
| JP | 2014-135627 A | 7/2014 |
| JP | 2016-025439 A | 2/2016 |
| WO | 2016/009728 A1 | 1/2016 |

OTHER PUBLICATIONS

International Preliminary Report on Patentability of PCT Application No. PCT/JP2017/002081, dated Sep. 27, 2018, 07 pages of English Translation and 03 pages of IPRP.

\* cited by examiner

FIG. 11

| | LOW FREQUENCY VISIBLE LIGHT LUMINANCE SIGNAL(Y_LF) | | | | | | | | | | |
|---|---|---|---|---|---|---|---|---|---|---|---|
| | | 0 | 0.1 | 0.2 | 0.3 | 0.4 | 0.5 | 0.6 | 0.7 | 0.8 | 0.9 | 1.0 |
| LOW FREQUENCY INFRARED LIGHT LUMINANCE SIGNAL (Yir_LF) | 0 | 0.25 | 0.5 | 0.5 | 0.5 | 0.5 | 0.5 | 0.5 | 0.5 | 0.5 | 0.5 | 0.5 |
| | 0.1 | 0.25 | 0 | 0.5 | 0.5 | 0.5 | 0.5 | 0.5 | 0.5 | 0.5 | 0.5 | 0.5 |
| | 0.2 | 0.25 | 0 | 0 | 0.5 | 0.5 | 0.5 | 0.5 | 0.5 | 0.5 | 0.5 | 0.5 |
| | 0.3 | 0.25 | 0 | 0 | 0 | 0.5 | 0.5 | 0.5 | 0.5 | 0.5 | 0.5 | 0.5 |
| | 0.4 | 0.25 | 0 | 0 | 0 | 0 | 0.5 | 0.5 | 0.5 | 0.5 | 0.5 | 0.5 |
| | 0.5 | 0.25 | 0 | 0 | 0 | 0 | 0 | 0.5 | 0.5 | 0.5 | 0.5 | 0.5 |
| | 0.6 | 0.25 | 0 | 0 | 0 | 0 | 0 | 0 | 0.5 | 0.5 | 0.5 | 0.5 |
| | 0.7 | 0.25 | 0 | 0 | 0 | 0 | 0 | 0 | 0 | 0.5 | 0.5 | 0.5 |
| | 0.8 | 0.25 | 0 | 0 | 0 | 0 | 0 | 0 | 0 | 0 | 0.5 | 0.5 |
| | 0.9 | 0.25 | 0 | 0 | 0 | 0 | 0 | 0 | 0 | 0 | 0 | 0.5 |
| | 1.0 | 0.25 | 0 | 0 | 0 | 0 | 0 | 0 | 0 | 0 | 0 | 0 |

SIGNAL PROCESSING APPARATUS, IMAGING PICKUP APPARATUS, AND SIGNAL PROCESSING METHOD

CROSS REFERENCE TO RELATED APPLICATIONS

This application is a U.S. National Phase of International Patent Application No. PCT/JP2017/002081 filed on Jan. 23, 2017, which claims priority benefit of Japanese Patent Application No. JP 2016-050084 filed in the Japan Patent Office on Mar. 14, 2016. Each of the above-referenced applications is hereby incorporated herein by reference in its entirety.

TECHNICAL FIELD

The present technology relates to signal processing devices, imaging devices, and signal processing methods. More particularly, the present technology relates to a signal processing device and an imaging device, which are used to mix a visible light signal and an infrared light signal together to generate an image signal, and also relates to a signal processing method for the devices.

BACKGROUND ART

In related art, an imaging device that generates an image signal with improved visibility by synthesizing a visible light signal and an infrared light signal corresponding to infrared light is used in imaging devices such as security cameras used in a low illuminance environment. In one example, an imaging device that synthesizes a visible light luminance signal generated from a visible light signal and an infrared light luminance signal generated from an infrared light signal to generate a synthesized luminance signal is used. A system is developed in which synthesis is performed on the basis of a synthesis ratio corresponding to a visible light luminance signal value in performing the synthesis (e.g., see Patent Literature 1).

CITATION LIST

Patent Literature

Patent Literature 1: JP 2014-135627A

DISCLOSURE OF INVENTION

Technical Problem

In the above-described technique in related art, the synthesis ratio is determined on the basis of the visible light luminance signal. Thus, in a case where a value of the infrared light signal is larger than that of the visible light signal like the case of performing imaging while applying the infrared light, the color reproducibility of the synthesized image signal decreases, thereby deteriorating the image quality disadvantageously.

The present technology is made in view of such a situation, and it is intended to prevent deterioration in image quality in the case of generating a color image signal by mixing a visible light signal and an infrared light signal together while applying infrared light.

Solution to Problem

The present technology is made in view of the above problem. A first aspect of the present technology is a signal processing device and a signal processing method, the signal processing device including: a mixture ratio creator configured to create a mixture ratio that is a ratio in mixing a low frequency visible light signal that is a low frequency component of a visible light signal and a low frequency invisible light signal that is a low frequency component of an invisible light signal together on a basis of the low frequency visible light signal and the low frequency invisible light signal; and a mixer configured to mix the low frequency visible light signal and the low frequency invisible light signal together on a basis of the mixture ratio to generate a mixed signal. This produces an effect that the mixture ratio is created on the basis of the low frequency visible light signal and the low frequency invisible light signal.

In addition, in the first aspect, the mixture ratio creator may create the mixture ratio on a basis of which of the low frequency visible light signal and the low frequency invisible light signal is larger. This produces an effect that the mixture ratio is created on the basis of which of the low frequency visible light signal or the low frequency invisible light signal is larger.

In addition, in the first aspect, the mixture ratio creator may create the mixture ratio at which a ratio of the low frequency invisible light signal in the mixing is set to approximately zero in a case where the low frequency visible light signal is smaller than the low frequency invisible light signal. This produces an effect that the mixture ratio at which the ratio of the low frequency invisible light signal is approximately zero is created in the case where the low frequency visible light signal is smaller than the low frequency invisible light signal.

In addition, in the first aspect, the mixture ratio creator may create the mixture ratio at which ratios of the low frequency visible light signal and the low frequency invisible light signal in the mixing are made substantially equal to each other in a case where the low frequency visible light signal is larger than the low frequency invisible light signal. This produces an effect that the mixture ratio at which the ratios of the low frequency visible light signal and the low frequency invisible light signal are made equal to each other is created in the case where the low frequency visible light signal is larger than the low frequency invisible light signal.

In addition, in the first aspect, the mixture ratio creator may limit the mixture ratio to a predetermined value so that the mixed signal is smaller than the low frequency invisible light signal in a case where the low frequency visible light signal is smaller than a predetermined threshold. This produces an effect that the mixed signal is set to be smaller than the low frequency invisible light signal in the case where the low frequency visible light signal is smaller than the predetermined threshold.

In addition, in the first aspect, a high frequency signal adder configured to add a high frequency invisible light signal that is a high frequency component of the invisible light signal to the mixed signal may be further included. This produces an effect that the high frequency signal is added to the mixed signal.

In addition, in the first aspect, the high frequency signal adder may add a high frequency visible light signal that is a high frequency component of the visible light signal and the high frequency invisible light signal to the mixed signal. This produces an effect that the high frequency visible light signal and the high frequency invisible light signal are added to the mixed signal.

In addition, in the first aspect, a visible light signal filter configured to generate the low frequency visible light signal from the visible light signal; and an invisible light signal filter configured to generate the low frequency invisible light signal from the invisible light signal may be further included. The mixture ratio creator may create the mixture ratio based on the generated low frequency visible light signal and the generated low frequency invisible light signal, and the mixer may mix the generated low frequency visible light signal and the generated low frequency invisible light signal together. This produces an effect that the visible light signal filter and the invisible light signal filter generate the low frequency visible light signal and the low frequency invisible light signal, respectively.

In addition, in the first aspect, the visible light signal filter may include a low-pass filter. This produces an effect that the low-pass filter generates the low frequency visible light signal.

In addition, in the first aspect, the invisible light signal filter may include a low-pass filter. This produces an effect that the low-pass filter generates the low frequency invisible light signal.

In addition, in the first aspect, the visible light signal filter may include a noise reduction unit configured to remove noise of the visible light signal. This produces an effect that the noise reduction unit generates the low frequency visible light signal.

In addition, in the first aspect, the invisible light signal filter may include a noise reduction unit configured to remove noise of the invisible light signal. This produces an effect that the noise reduction unit generates the low frequency invisible light signal.

In addition, in the first aspect, the low frequency visible light signal may be a low frequency visible light luminance signal that is a low frequency component of a visible light luminance signal, the mixture ratio creator may create the mixture ratio on a basis of the low frequency visible light luminance signal and the low frequency invisible light signal, and the mixer may mix the low frequency visible light luminance signal and the low frequency invisible light signal together. This produces an effect that the mixture ratio is created on the basis of the low frequency visible light luminance signal and the low frequency invisible light signal.

In addition, in the first aspect, the low frequency invisible light signal may be a low frequency infrared light signal that is a low frequency component of an infrared light signal corresponding to infrared light. This produces an effect that the mixture ratio is created on the basis of the low frequency visible light luminance signal and the low frequency infrared light signal.

In addition, a second aspect of the present technology is an imaging device including: an image sensor configured to generate a visible light signal and an invisible light signal; a mixture ratio creator configured to create a mixture ratio that is a ratio in mixing a low frequency visible light signal that is a low frequency component of the generated visible light signal and a low frequency invisible light signal that is a low frequency component of the generated invisible light signal together on a basis of the low frequency visible light signal and the low frequency invisible light signal; and a mixer configured to mix the low frequency visible light signal and the low frequency invisible light signal together on a basis of the mixture ratio to generate a mixed signal. This produces an effect that the mixture ratio is created on the basis of the low frequency visible light signal and the low frequency invisible light signal.

Advantageous Effects of Invention

According to the present technology, it is possible to achieve an advantageous effect of preventing deterioration in image quality in the case of generating a color image signal by mixing a visible light signal and an infrared light signal together while applying infrared light. Note that effects described herein are not necessarily limitative, and any of the effects described in the present disclosure may be admitted.

BRIEF DESCRIPTION OF DRAWINGS

FIG. 11 is a diagram illustrating an example of a mixture ratio according to an embodiment of the present technology.

MODE(S) FOR CARRYING OUT THE INVENTION

Modes for carrying out the present technology (hereinafter referred to as an embodiment) will be described. The description is given in the following order.
1. First embodiment (example in the case of generating a low frequency visible light luminance signal by a low-pass filter)

2. Second embodiment (example in the case of generating a low frequency visible light luminance signal by a noise reduction unit)

1. FIRST EMBODIMENT

Figure 1:
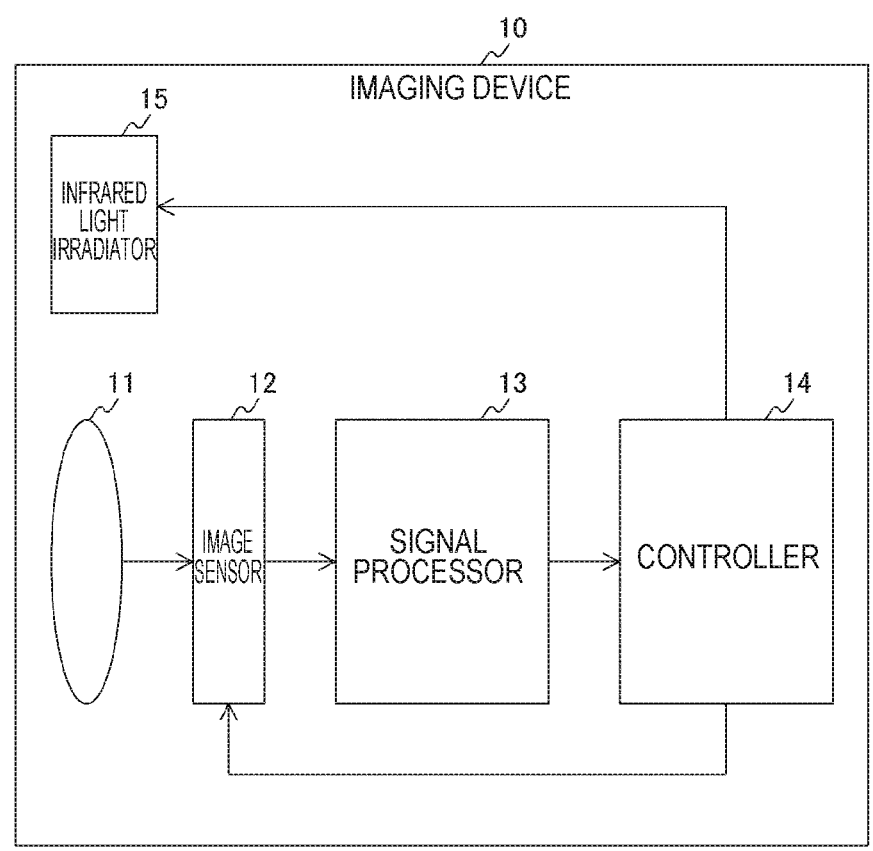
FIG. 1 is a diagram illustrating an exemplary configuration of an imaging device 10 according to an embodiment of the present technology.

FIG. 1 is a diagram illustrating an exemplary configuration of an imaging device 10 according to an embodiment of the present technology. The imaging device 10 includes a lens 11, an image sensor 12, a signal processor 13, a controller 14, and an infrared light irradiator 15.

The lens 11 optically forms an image of a subject on the image sensor 12.

The image sensor 12 converts an optical image formed by the lens 11 into an image signal and outputs it. The image sensor 12 includes pixels, which are used to generate an image signal and arranged in a two-dimensional lattice pattern on a plane on which the optical image is formed. The image signal output from the pixel includes a visible light signal corresponding to a visible light component and an infrared light signal corresponding to an infrared light component.

An example of the image sensor 12 having pixels as described above includes an image sensor having three kinds of pixels, that is, a pixel for generating an image signal corresponding to red light and infrared light, a pixel for generating an image signal corresponding to green light and infrared light, and a pixel for generating an image signal corresponding to blue light and infrared light. Furthermore, it is also possible to use an image sensor having four kinds of pixels additionally including a pixel for generating an image signal corresponding to white light and infrared light. The image signal corresponding to red light and infrared light, the image signal corresponding to green light and infrared light, the image signal corresponding to blue light and infrared light, and the image signal corresponding to white light and infrared light are referred to as R+IR, G+IR, B+IR, and W+IR signals, respectively. The pixels for generating the R+IR, G+IR, B+IR, and W+IR signals are referred to as R+IR, G+IR, B+IR, and W+IR pixels, respectively. The arrangement of pixels corresponding to different light colors as described above is achieved by causing each pixel to be provided with a color filter. The spectral characteristics of the color filter are made to correspond to a specific light color to constitute the above-described four kinds of pixels.

Further, the image sensor 12 has an analog-to-digital converter and outputs an image signal for one screen converted into a digital signal. Here, an image signal for one screen is referred to as a frame.

The signal processor 13 processes the image signal output from the image sensor 12. The signal processor 13 separates the output image signal into a visible light signal and an infrared light signal, and performs processing such as noise removal. Then, the visible light signal and the infrared light signal subjected to noise removal or the like are synthesized and outputted. The detailed configuration of the signal processor 13 will be described later. Moreover, the signal processor 13 is an example of a signal processing device set forth in the claims.

The controller 14 outputs the image signal received from the signal processor 13 to the outside of the imaging device 10. In addition, the controller 14 controls the entire imaging device 10.

The infrared light irradiator 15 irradiates a subject with infrared light. The infrared light irradiator 15 applies infrared light under the control of the controller 14. Details of irradiation with infrared light will be described later.

[Configuration of Image Sensor]

Figure 2:
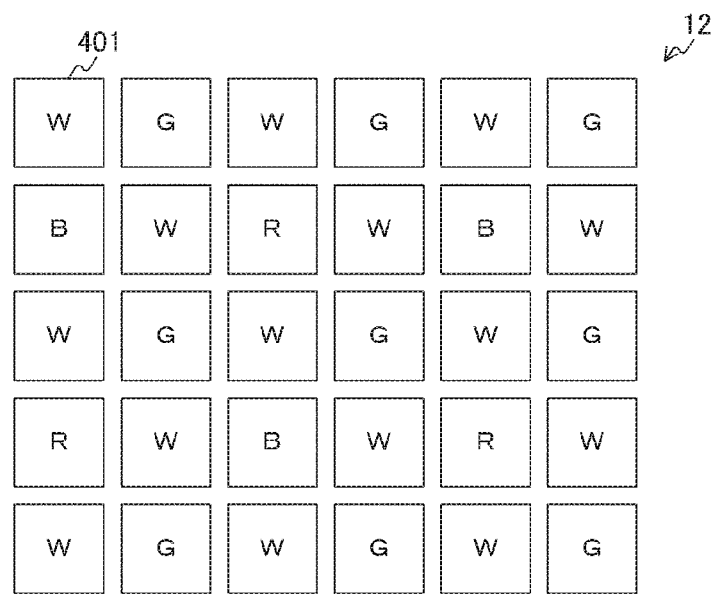
FIG. 2 is a diagram illustrating an exemplary configuration of an image sensor 12 according to an embodiment of the present technology.

FIG. 2 is a diagram illustrating an exemplary configuration of the image sensor 12 according to the embodiment of the present technology. This figure illustrates the arrangement of pixels on a screen of the image sensor 12. A square in this figure represents pixels 401 arranged on a screen of the image sensor 12 in a two-dimensional lattice pattern. Moreover, the symbols described in the pixel 401 indicate the types of the pixel 401. The pixels indicating R, G, B, and W represent R+IR, G+IR, B+IR, and W+IR pixels, respectively. These pixels are arranged on the screen in accordance with certain rules. This figure illustrates an example in which W+IR pixels are arranged in a checkered pattern and the R+IR pixels, G+IR pixels, and B+IR pixels are arranged in the remaining portions.

[Irradiation with Infrared Light]

Figure 3:
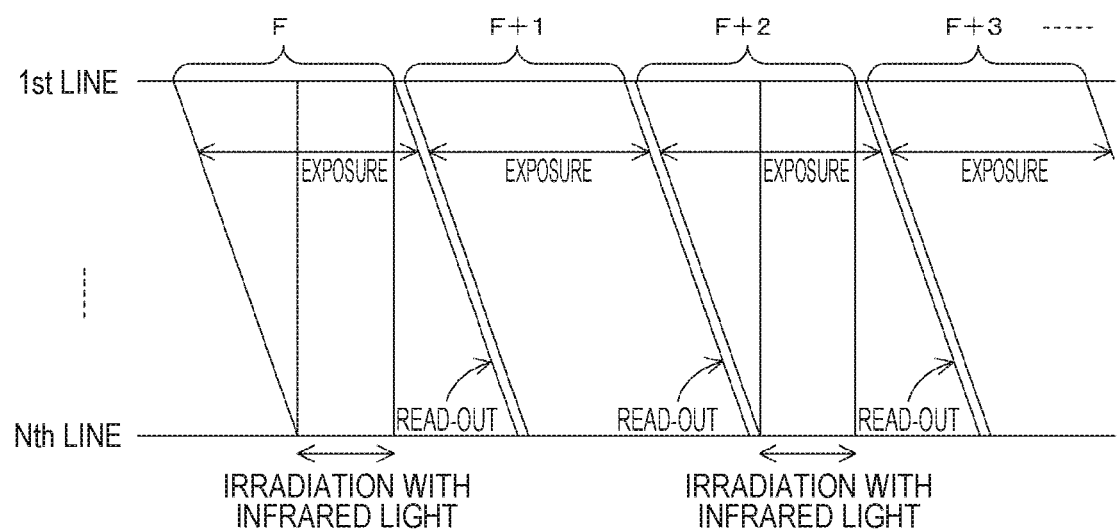
FIG. 3 is a diagram illustrating an example of irradiation with infrared light according to an embodiment of the present technology.

FIG. 3 is a diagram illustrating an example of irradiation with infrared light according to an embodiment of the present technology. This figure illustrates how to expose each frame of the image sensor 12 and to read out an image signal after exposure. In this figure, it is assumed that the image sensor 12 is constituted as a screen having N lines. The image sensor 12 sequentially performs the start and stop of exposure and the output of an image signal for each line. The image signal for one frame is generated by performing this operation from $1^{st}$ to $N^{th}$ lines. In this way, a method in which the start and stop of exposure and the output of the image signal are sequentially performed for each line is referred to as a rolling shutter method. In addition, the period from the start to the end of exposure is referred to as an exposure period. In the embodiment of the present technology, the irradiation with infrared light by the infrared light irradiator 15 is performed every exposure period. Here, the frame generated in the exposure period during irradiation with infrared light (F and F+2, in this figure) is referred to as an infrared light irradiation frame, and the exposure period (F+1 and F+3, in this figure) during irradiation with no infrared light is referred to as a visible light frame. The irradiation with infrared light makes it possible to increase the signal level of the image signal under the low illuminance environment, thereby improving the visibility.

[Configuration of Signal Processor]

Figure 4:
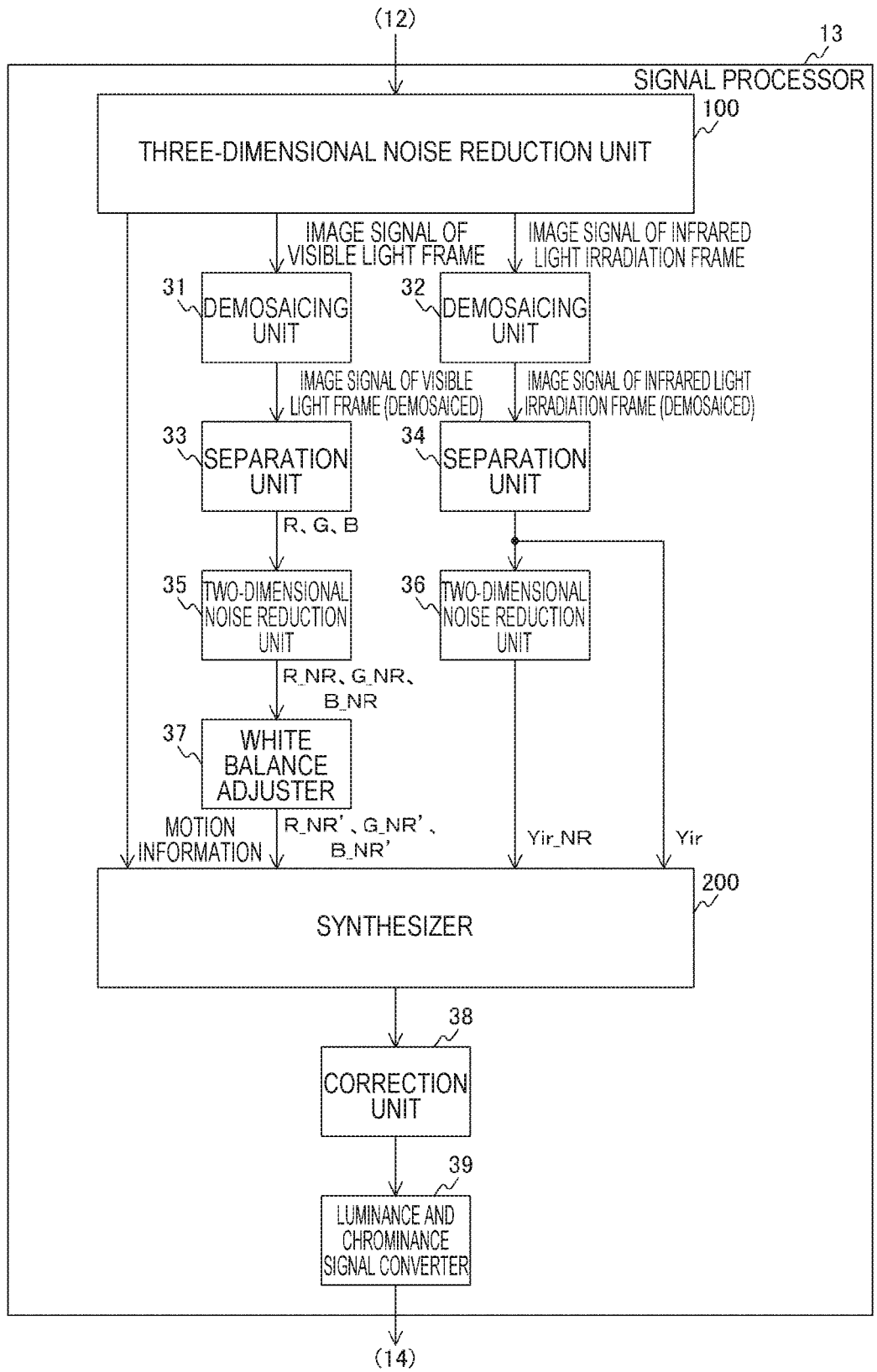
FIG. 4 is a diagram illustrating an exemplary configuration of a signal processor 13 according to an embodiment of the present technology.

FIG. 4 is a diagram illustrating an exemplary configuration of the signal processor 13 according to an embodiment of the present technology. The signal processor 13 includes a three-dimensional noise reduction unit 100, demosaicing units 31 and 32, and separation units 33 and 34. In addition, the signal processor 13 further includes two-dimensional noise reduction units 35 and 36, a white balance adjuster 37, a synthesizer 200, a correction unit 38, and a luminance and chrominance signal converter 39.

The three-dimensional noise reduction unit 100 removes noise of the image signal output from the image sensor 12 by performing three-dimensional noise reduction processing. Here, the three-dimensional noise reduction processing is the processing of removing noise by using image signals belonging to a plurality of consecutive frames. The three-dimensional noise reduction unit 100 performs the noise reduction processing individually on the image signals of the visible light frame and the infrared light irradiation frame. This is because the visible light frame and the infrared light irradiation frame are different in infrared light signal components included in the image signal. The processed image signal of the visible light frame and the processed image signal of the infrared light irradiation frame are outputted to the demosaicing units 31 and 32, respectively. In addition, the three-dimensional noise reduction unit 100 detects a region with motion in the input image signal, and further outputs motion information that is information regarding this region. Here, the region with motion is a region including a person or the like that is moving in the frame. Details of the configuration of the three-dimensional noise reduction unit 100 will be described later.

The demosaicing units 31 and 32 perform demosaicing processing on the image signals output from the three-dimensional noise reduction unit 100. This demosaicing processing is to interpolate image signals of other colors that are insufficient for monochrome image signals output from the image sensor 12. This demosaicing processing allows the demosaicing unit 31 to increase the number of image signals per pixel to four, that is, R+IR, G+IR, B+IR, and W+IR signals. The demosaicing unit 31 performs the demosaicing processing on the image signal of the visible light frame and outputs it to the separation unit 33. The demosaicing unit 32 performs the demosaicing processing on the image signal of the infrared light irradiation frame, in one example, W+IR signal, and outputs it to the separation unit 34.

The separation units 33 and 34 separate the visible light signal and the infrared light signal from the image signals output by the demosaicing units 31 and 32, respectively. This separation can be performed, in one example, on the basis of the following formulas.

$$IR = (R_{IR} + G_{IR} + B_{IR} - W_{IR})/2$$

$$R = R_{IR} - IR$$

$$G = G_{IR} - IR$$

$$B = B_{IR} - IR$$

Here, IR represents the image signal corresponding to infrared light. In addition, R, G, and B represent an image signal corresponding to red light (red image signal), an image signal corresponding to green light (green image signal), and an image signal corresponding to blue light (blue image signal), respectively. In addition, $R_{IR}$, $G_{IR}$, $B_{IR}$, and $W_{IR}$ represent the R+IR signal, the G+IR signal, the B+IR signal, and the W+IR signal, respectively.

The separation unit 33 outputs the red image signal R, the green image signal G, and the blue image signal B among the image signals separated from the image signal of the visible light frame to the two-dimensional noise reduction unit 35. In this case, the environmental infrared light signal component included in the image signal of the visible light frame is removed. Here, the red image signal R, the green image signal G, and the blue image signal B correspond to a visible light signal. On the other hand, the separation unit 34 outputs the luminance signal of the infrared light irradiation frame among the image signals separated from the image signal of the infrared light irradiation frame to a two-dimensional noise reduction unit 36 and the synthesizer 200. Here, as an example of the luminance signal of this infrared light irradiation frame, an infrared light luminance signal Yir, which is a signal generated by demosaicing the W+IR signal output from the W+IR pixel, is outputted. Here, the infrared light luminance signal Yir is an image signal corresponding to infrared light.

The two-dimensional noise reduction units 35 and 36 perform two-dimensional noise reduction processing to remove noise of the image signal output from the separation unit 33 or the like. Here, the two-dimensional noise reduction processing is the processing of removing noise by using image signals belonging to the same frame. The two-dimensional noise reduction unit 35 performs the noise reduction processing on the red image signal R, the green image signal G, and the blue image signal B output from the separation unit 33 and outputs the result to the white balance adjuster 37. On the other hand, the two-dimensional noise reduction unit 36 performs the noise reduction processing on the infrared light luminance signal Yir output from the separation unit 34 and outputs the result to the synthesizer 200. In this figure, the red image signal R, the green image signal G, the blue image signal B, and the infrared light luminance signal Yir from which noise is removed are described as R_NR, G_NR, B_NR, and Yir_NR, respectively.

The white balance adjuster 37 performs white balance adjustment on the red image signal R_NR, the green image signal G_NR, and the blue image signal B_NR, which are visible light signals output from the two-dimensional noise reduction unit 35. Here, the white balance adjustment is the processing of adjusting the red image signal, the green image signal, and the blue image signal for a white-colored subject so that they have the same signal level. The white balance adjuster 37 outputs the adjusted red image signal, green image signal, and blue image signal (described as R_NR', G_NR', and B_NR', respectively, in this figure) to the synthesizer 200.

The synthesizer 200 synthesizes a visible light signal subjected to white balance adjustment and an infrared light signal from which noise is removed to generate a low frequency synthesized signal. Here, the low frequency synthesized signal is a signal generated by mixing a visible light signal and an infrared light signal together. During the image capturing in a low illuminance environment, when an image signal is generated while irradiating a subject with infrared light, the generated image signal becomes a pseudo-color image signal, resulting in an image with reduced color reproducibility. Thus, the generation of the low frequency synthesized signal makes it possible to obtain an image signal with improved visibility and color reproducibility. The synthesizer 200 switches and outputs the generated low frequency synthesized signal, visible light signal, and infrared light signal (infrared light luminance signal Yir). In addition, the synthesizer 200 further performs interpolation of the high frequency component of the visible light signal lost in the process of noise removal. Details of the configuration of the synthesizer 200 will be described later.

The correction unit 38 performs gamma correction on the image signal output from the synthesizer 200. Here, the gamma correction is the processing of correcting the red image signal, the green image signal, and the blue image signal along the gamma curve. The correction unit 38 outputs the gamma-corrected red image signal, green image signal, and blue image signal to the luminance and chrominance signal converter 39.

The luminance and chrominance signal converter 39 converts the red image signal, the green image signal, and the blue image signal output from the correction unit 38 into a luminance signal and a chrominance signal. This conversion can be performed on the basis of a known conversion formula. The converted luminance signal and chrominance signal are output to the controller 14.

[Configuration of Three-Dimensional Noise Reduction Unit]

Figure 5:
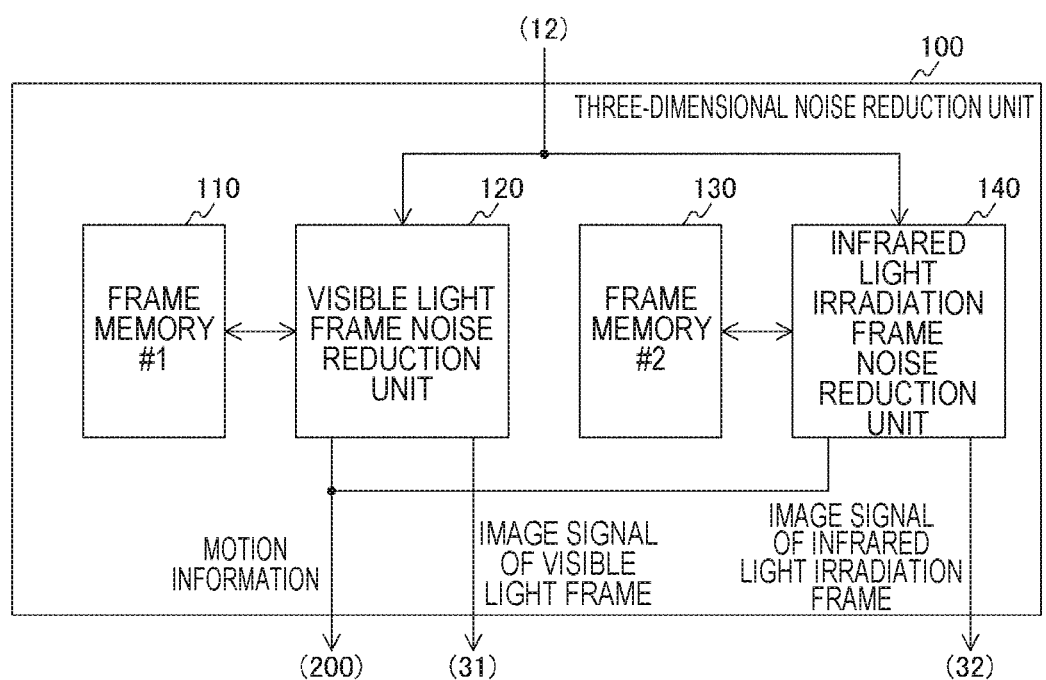
FIG. 5 is a diagram illustrating an exemplary configuration of a three-dimensional noise reduction unit 100 according to an embodiment of the present technology.

FIG. 5 is a diagram illustrating an exemplary configuration of the three-dimensional noise reduction unit 100 according to the embodiment of the present technology. The three-dimensional noise reduction unit 100 includes frame memories #1 (110) and #2 (130), a visible light frame noise reduction unit 120, and an infrared light irradiation frame noise reduction unit 140.

The frame memories #1 (110) and #2 (130) are memories that hold an image signal. The frame memory #1 (110) holds image signals of a plurality of visible light frames output from the visible light frame noise reduction unit 120. The frame memory #2 (130) holds image signals of a plurality of infrared light irradiation frames output from the infrared light irradiation frame noise reduction unit 140.

The visible light frame noise reduction unit 120 performs the three-dimensional noise reduction processing on the image signal of the visible light frame among the image signals output from the image sensor 12. The visible light frame noise reduction unit 120 causes the frame memory #1 (110) to hold the image signal of the visible light frame, and performs three-dimensional noise reduction processing on the basis of the image signal held in the frame memory #1 (110). An example of this processing can include a method of calculating an average for each pixel of image signals in a plurality of consecutive frames. In this case, it is necessary to limit the three-dimensional noise reduction processing for an image with motion to inhibit the deterioration in image quality. Thus, the visible light frame noise reduction unit 120 detects a region with motion and limits the noise reduction processing in the region. In addition, the visible light frame noise reduction unit 120 outputs the image signal subjected to the noise removal processing to the demosaicing unit 31 as a visible light frame image signal. Furthermore, the visible light frame noise reduction unit 120 outputs the detected region with motion to the synthesizer 200 as motion information.

The infrared light irradiation frame noise reduction unit 140 performs the three-dimensional noise reduction processing on the image signal of the infrared light irradiation frame among the image signals output from the image sensor 12. The infrared light irradiation frame noise reduction unit 140 causes the frame memory #2 (130) to hold the image signal of the infrared light irradiation frame, and performs the three-dimensional noise reduction processing on the basis of the image signal held in the frame memory #2 (130). In addition, the infrared light irradiation frame noise reduction unit 140 outputs the image signal subjected to the noise removal processing to the demosaicing unit 32 as the infrared light irradiation frame image signal. Furthermore, the infrared light irradiation frame noise reduction unit 140 outputs the detected region with motion to the synthesizer 200 as motion information.

[Configuration of Synthesizer]

Figure 6:
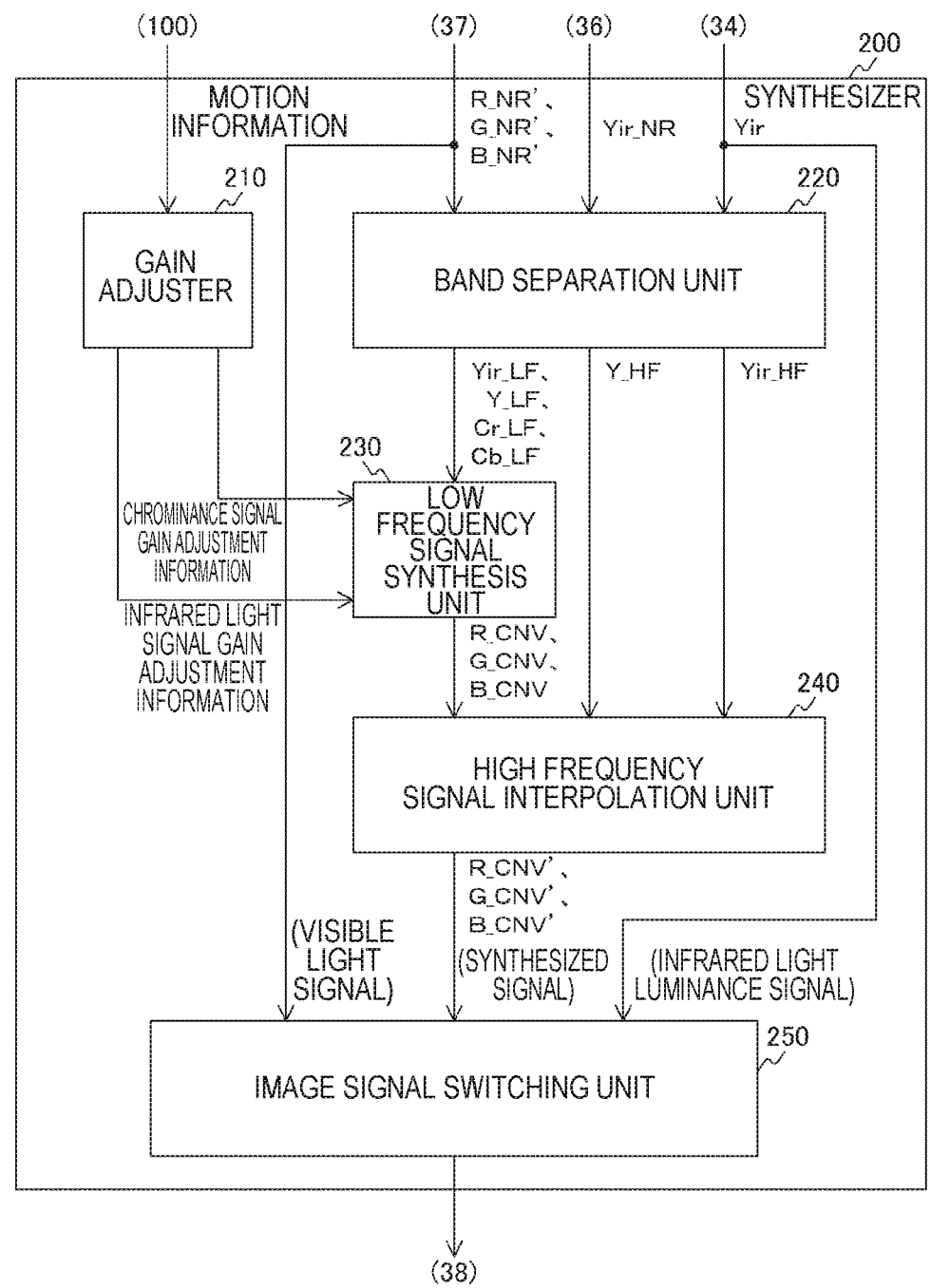
FIG. 6 is a diagram illustrating an exemplary configuration of a synthesizer 200 according to a first embodiment of the present technology.

FIG. 6 is a diagram illustrating an exemplary configuration of the synthesizer 200 according to a first embodiment of the present technology. The synthesizer 200 includes a gain adjuster 210, a band separation unit 220, a low frequency signal synthesis unit 230, a high frequency signal interpolation unit 240, and an image signal switching unit 250.

The gain adjuster 210 generates chrominance signal gain adjustment information and infrared light signal gain adjustment information on the basis of the motion information output from the three-dimensional noise reduction unit 100. Here, the chrominance signal gain adjustment information is information used to adjust the level of the chrominance signal and used for the low frequency signal synthesis unit 230 to be described later to synthesize the low frequency synthesized signal and the low frequency infrared light luminance signal. As described with reference to FIG. 5, the three-dimensional noise reduction unit 100 limits removal of noise in a region with motion. Thus, this region has relatively noisy images, thereby deteriorating the visibility. Accordingly, the signal level of the chrominance signal in the region with motion is reduced and the mixture ratio of the infrared light signal is increased. This makes it possible to reduce deterioration in visibility in the region.

The band separation unit 220 converts the visible light signal output from the white balance adjuster 37 into a luminance signal and a chrominance signal. In addition, the band separation unit 220 generates a low frequency visible light luminance signal that is a low frequency component of the converted luminance signal and generates a low frequency chrominance signal that is a low frequency component of the converted chrominance signal. Furthermore, the band separation unit 220 generates a high frequency infrared light luminance signal that is a high frequency component of the infrared light luminance signal output from the separation unit 34. Details of the configuration of the band separation unit 220 will be described later.

The low frequency signal synthesis unit 230 generates the low frequency synthesized signal from the low frequency visible light luminance signal, the low frequency infrared light luminance signal, or the like output from the band separation unit 220. Details of the configuration of the low frequency signal synthesis unit 230 will be described later.

The high frequency signal interpolation unit 240 is used to interpolate the high frequency visible light signal and the high frequency infrared light luminance signal generated by the band separation unit 220 with respect to the low frequency synthesized signal generated by the low frequency signal synthesis unit 230. As will be described later, the band separation unit 220 removes the high frequency components of the visible light luminance signal and the chrominance signal. High frequency noise is removed, and high frequency components are also removed in the image signal of a portion having a sharp signal change like the edge portion of an image. For this reason, the signal at the edge portion has a gradual change, causing edge blur. Thus, the high frequency signal interpolation unit 240 performs interpolation of high frequency components to prevent the deterioration in image quality such as blurring of edges. The image signal in which the high frequency component is interpolated by the high frequency signal interpolation unit 240 is referred to as a synthesized signal. Details of the configuration of the high frequency signal interpolation unit 240 will be described later.

The image signal switching unit 250 switches between the visible light signal, the synthesized signal, and the infrared light luminance signal. The image signal switching unit 250 switches between the visible light signal, the synthesized signal, and the infrared light luminance signal depending on the brightness of the image of the visible light frame. In switching, the transition between images is smoothly performed. In one example, when the switching from the visible light signal to the synthesized signal is performed, the image of the visible light signal is controlled in such a way to perform gradual transition to the synthesized signal. The output of all or some of the synthesized signals in switching makes it possible to implement "color night view mode" that is a mode for outputting a color image during irradiation with infrared light. Details of the configuration of the image signal switching unit 250 will be described later. Moreover, the configuration of the synthesizer 200 is not limited to the above example. In one example, the image signal switching unit 250 may be omitted. The visible light signal, the synthesized signal, and the infrared light luminance signal can be outputted individually.

[Configuration of Band Separation Unit]

Figure 7:
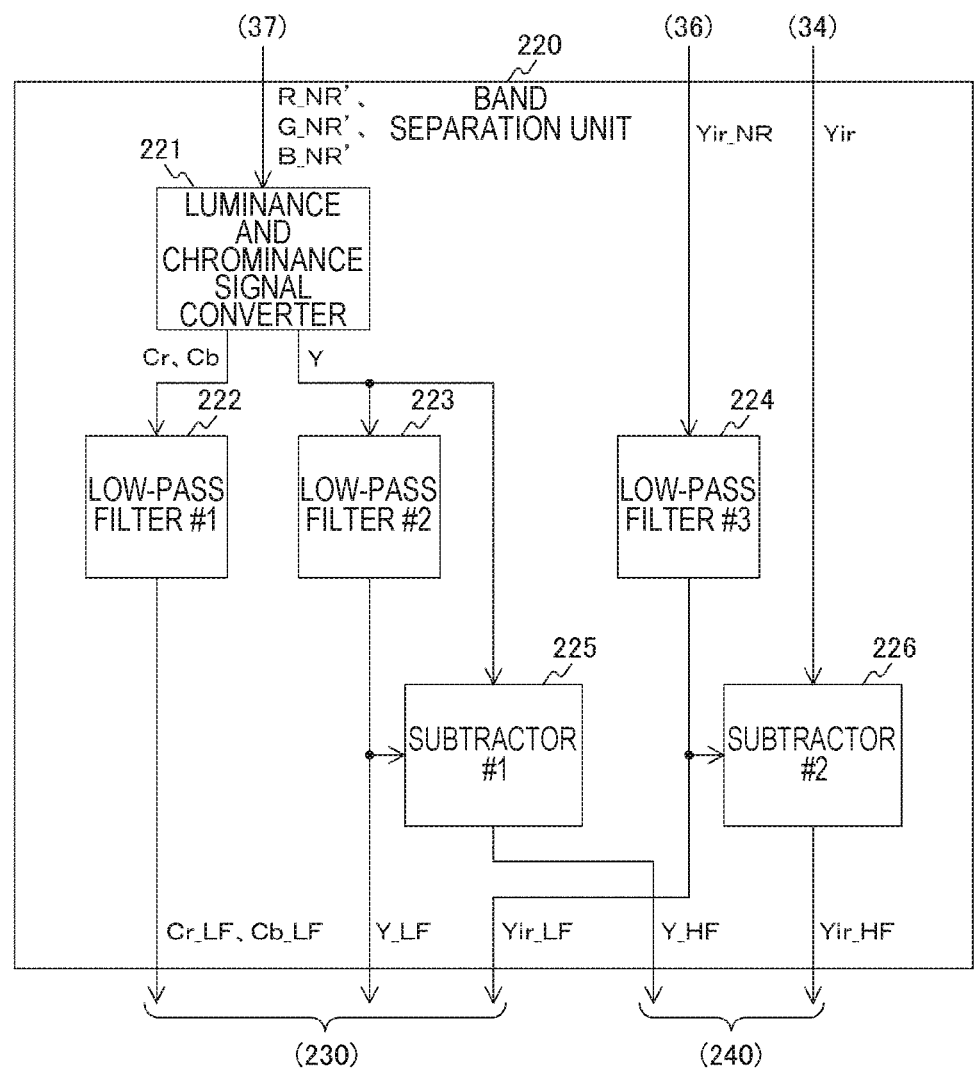
FIG. 7 is a diagram illustrating an exemplary configuration of a band separation unit 220 according to the first embodiment of the present technology.

FIG. 7 is a diagram illustrating an exemplary configuration of the band separation unit 220 according to the first embodiment of the present technology. The band separation unit 220 includes a luminance and chrominance signal converter 221, low-pass filters #1 (222) to #3 (224), and subtractors #1 (225) and #2 (226).

The luminance and chrominance signal converter 221 converts the visible light signals (R_NR', G_NR', and B_NR') output from the white balance adjuster 37 into a visible light luminance signal Y and the chrominance signals Cr and Cb. Here, the chrominance signal Cr is a signal based on the difference between the red image signal and the visible light luminance signal Y, and the chrominance signal Cb is a signal based on the difference between the blue image signal and the visible light luminance signal Y.

The low-pass filters #1 (222) to #3 (224) attenuate the high frequency component of the image signal or the like to generate an image signal of the low frequency component. The attenuation of the high frequency component makes it possible to remove noise of the image signal, thereby improving the visibility of the image signal. The low-pass filter #1 (222) generates low frequency chrominance signals Cr_LF and Cb_LF that are low frequency components of the chrominance signals Cr and Cb. The low-pass filter #2 (223) generates a low frequency visible light luminance signal Y_LF that is a low frequency component of the visible light luminance signal Y. The low-pass filter #3 (224) generates a low frequency infrared light luminance signal Yir_LF that is a low frequency component of an infrared light luminance signal Yir_NR output from the two-dimensional noise reduction unit 36. The low frequency chrominance signals Cr_LF and Cb_LF, the low frequency visible light luminance signal Y_LF, and the low frequency infrared light luminance signal Yir_LF are outputted to the low frequency signal synthesis unit 230. An example of these low-pass filters #1 (222) to #3 (224) can include a digital filter.

The subtractors #1 (225) and #2 (226) perform subtraction between image signals or the like. The subtractor #1 (225) subtracts the low frequency visible light luminance signal Y_LF from the visible light luminance signal Y. This allows a high frequency visible light luminance signal Y_HF that is a high frequency component of the visible light luminance signal Y to be generated. On the other hand, the subtractor #2 (226) subtracts the low frequency infrared light luminance signal Yir_LF from the infrared light luminance signal Yir output by the separation unit 34. This allows a high frequency infrared light luminance signal Yir_HF that is a high frequency component of the infrared light luminance signal Yir to be generated. The high frequency visible light luminance signal Y_HF and the high frequency infrared light luminance signal Yir_HF are outputted to the high frequency signal interpolation unit 240.

[Configuration of Low Frequency Signal Synthesis Unit]

Figure 8:
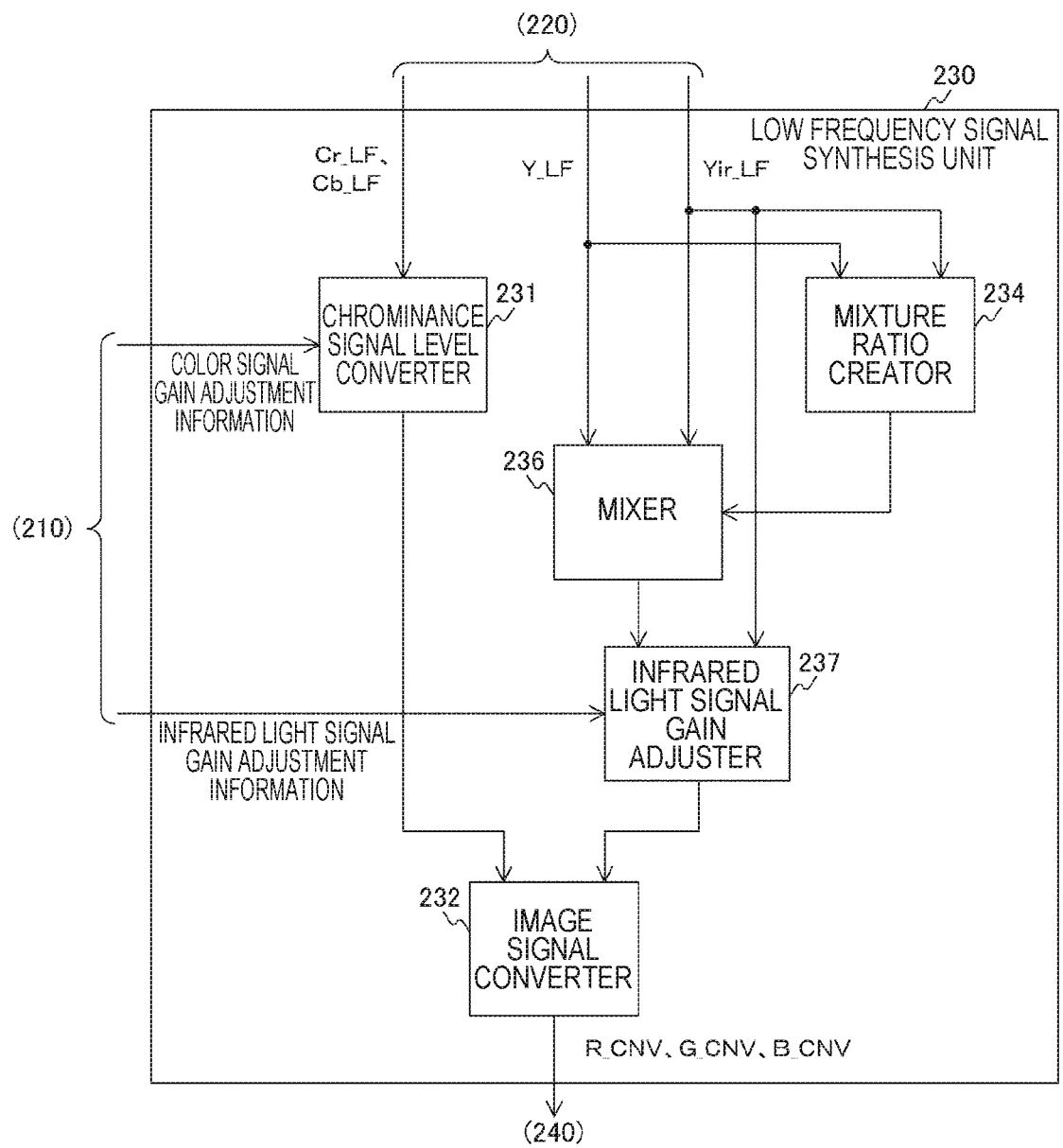
FIG. 8 is a diagram illustrating an exemplary configuration of a low frequency signal synthesis unit 230 according to the first embodiment of the present technology.

FIG. 8 is a diagram illustrating an exemplary configuration of the low frequency signal synthesis unit 230 according to the first embodiment of the present technology. The low frequency signal synthesis unit 230 includes a chrominance signal level converter 231, an infrared light signal gain adjuster 237, an image signal converter 232, a mixture ratio creator 234, and a mixer 236.

The chrominance signal level converter 231 converts the signal levels of the low frequency chrominance signals Cr_LF and Cb_LF output from the band separation unit 220 on the basis of the chrominance signal gain adjustment information output from the gain adjuster 210. In a case where a target image signal is an image signal in the region with motion, the signal levels of the low frequency chrominance signals Cr_LF and Cb_LF are reduced. This makes it possible to attenuate noise components included in the low frequency chrominance signals Cr_LF and Cb_LF.

The mixture ratio creator 234 creates a mixture ratio that is a ratio in mixing the low frequency visible light signal and the low frequency invisible light signal on the basis of the low frequency visible light signal and the low frequency invisible light signal. The mixture ratio creator 234 creates a mixture ratio $\alpha 1$ on the basis of the low frequency visible light luminance signal Y_LF and the low frequency infrared light luminance signal Yir_LF, which are output from the band separation unit 220. The mixture ratio is created on the basis of the signal from which the high frequency components are removed, so it is possible to reduce the influence of noise. In one example, it is possible to create the mixture ratio $\alpha 1$ on the basis of a predetermined conversion table. Details of creation of the mixture ratio $\alpha 1$ will be described later.

The mixer 236 mixes the low frequency visible light signal and the low frequency invisible light signal on the basis of the mixture ratio $\alpha 1$ created by the mixture ratio creator 234. It is possible to perform this mixture, in one example, by alpha blending. Here, the mixer 236 in this figure mixes the low frequency visible light luminance signal Y_LF and the low frequency infrared light luminance signal Yir_LF together, which are output from the band separation unit 220, to generate a low frequency luminance signal. This mixture can be carried out on the basis of the following formula.

$$Y\_CNV = Y\_LF \times (1-\alpha 1L + Yir\_LF \times \alpha i$$

Here, Y_CNV represents a low frequency luminance signal. In this way, image signals from which a high frequency component is removed are mixed together, so it is possible to generate a low frequency luminance signal with reduced noise.

The infrared light signal gain adjuster 237 mixes the low frequency luminance signal Y_CNV output from the mixer 236 and the low frequency infrared light luminance signal Yir_LF output from the band separation unit 220 together. This mixture is performed on the basis of a mixture ratio $\alpha 2$. The infrared light signal gain adjuster 237 creates the mixture ratio $\alpha 2$ on the basis of the infrared light signal gain adjustment information output from the gain adjuster 210. Specifically, in the case where the target image signal is an image signal in the region with motion, the mixture ratio $\alpha 2$ used to increase the mixture ratio of the low frequency infrared light luminance signal is created. The mixture can be performed on the basis of the following formula.

$$Y\_CNV1 = Y\_CNV \times (1-\alpha 1C + Yir\_LF \times \alpha i$$

Here, Y_CNV' is a mixed signal. Thus, when it is an image signal in the region with motion, it is possible to increase the mixture ratio of the infrared light signal, thereby reducing the influence of noise.

The image signal converter 232 converts the luminance signal and the chrominance signal into R, G, and B signals. The image signal converter 232 converts the low frequency luminance signal Y_CNV' generated by the infrared light signal gain adjuster 237 and the low frequency chrominance signals Cr_LF and Cb_LF output from the chrominance signal level converter 231 into low frequency synthesized signals (R_CNV, G_CNV, and B_CNV). The conversion can be performed on the basis of a known conversion formula. The low frequency synthesized signal that is converted by the image signal converter 232 is output to the high frequency signal interpolation unit mixer 240.

[Configuration of High Frequency Signal Interpolation Unit]

Figure 9:
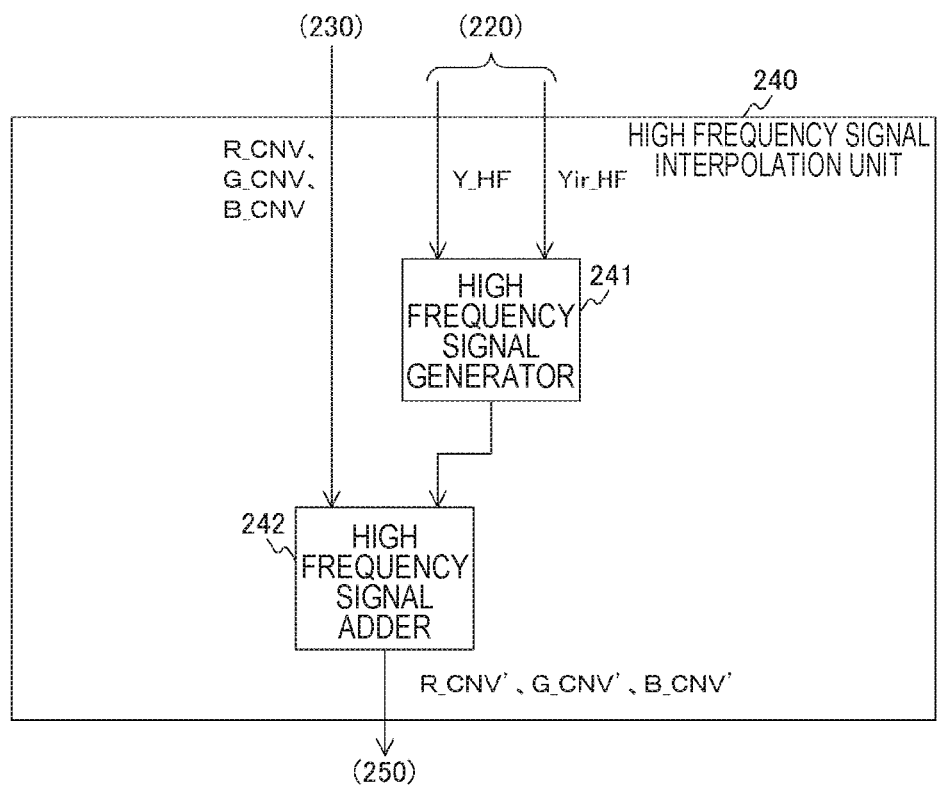
FIG. 9 is a diagram illustrating an exemplary configuration of a high frequency signal interpolation unit 240 according to the first embodiment of the present technology.

FIG. 9 is a diagram illustrating an exemplary configuration of the high frequency signal interpolation unit 240 according to the first embodiment of the present technology. The high frequency signal interpolation unit 240 includes a high frequency signal generator 241 and a high frequency signal adder 242.

The high frequency signal generator 241 generates a high frequency signal on the basis of the high frequency visible light luminance signal Y_HF and the high frequency infrared light luminance signal Yir_HF output from the band separation unit 220. The high frequency signal can be generated, in one example, by mixing the high frequency visible light luminance signal Y_HF and the high frequency infrared light luminance signal Yir_HF. In this case, it is possible to employ, in one example, a mixture method of increasing a mixture ratio of signals including a large edge portion among the high frequency visible light luminance signal Y_HF and the high frequency infrared light luminance signal Yir_HF. In addition, in one example, it is possible to output either the high frequency visible light luminance signal Y_HF or the high frequency infrared light luminance signal Yir_HF as a high frequency signal, without mixing these signals. In this case, in one example, it is possible to select the signal including a large edge portion of the high frequency visible light luminance signal Y_HF and the high frequency infrared light luminance signal Yir_HF, and to output it as a high frequency signal.

The use of the method of increasing a mixture ratio of signals including a large edge portion or the method of selecting a signal including a large edge portion makes it possible to achieve the satisfactory visibility of a subject in a case where an edge exists in any of the visible light signal and the infrared light signal.

The reflectance of visible light and infrared light is likely to change significantly depending on a subject. In one example, in a case where a subject is a fabric patterned with paint or dye, the reflectance of visible light and infrared light significantly change depending on the paint or the like. In this case, a change in luminance of the pattern can be observed with visible light, but a change in luminance of the pattern is often failed to be observed with infrared light. In such a case, the use of "function of selecting a large edge" described above makes it possible to use a high frequency signal of infrared light in a region where the visible light is very weak and to use a high frequency signal of visible light in a region where the visible light is larger than a certain degree. In this way, by making the mixture ratio of the high frequency visible light signal and infrared light signal independent from the mixture ratio of the low frequency visible light signal and infrared light signal, the satisfactory visibility of the subject can be achieved.

The high frequency signal adder 242 adds the low frequency luminance signal output from the low frequency signal synthesis unit 230 and the high frequency signal generated by the high frequency signal generator 241 together. This addition can be performed by adding a high frequency signal to each of the red image signal (R_CNV), the green image signal (G_CNV), and the blue image signal (B_CNV) that constitute the low frequency luminance signal. This makes it possible to interpolate the high frequency components of the image signal removed by the low-pass filters #1 (222) to #3 (224) described with reference to FIG. 7, thereby preventing blurring of the edge portion of the image. The high frequency signal adder 242 outputs synthesized signals (R_CNV', G_CNV', and B_CNV') whose high frequency components are interpolated to the image signal switching unit 250.

Moreover, a method based on the following formulas can be used as the simplest example of the above addition.

$$R\_CNV = R\_CNV + HF$$

$$G\_CNV = G\_CNV + HF$$

$$B\_CNV = B\_CNV + HF$$

Here, HF represents the high frequency signal generated by the high frequency signal generator 241.

[Configuration of Image Signal Switching Unit]

Figure 10:
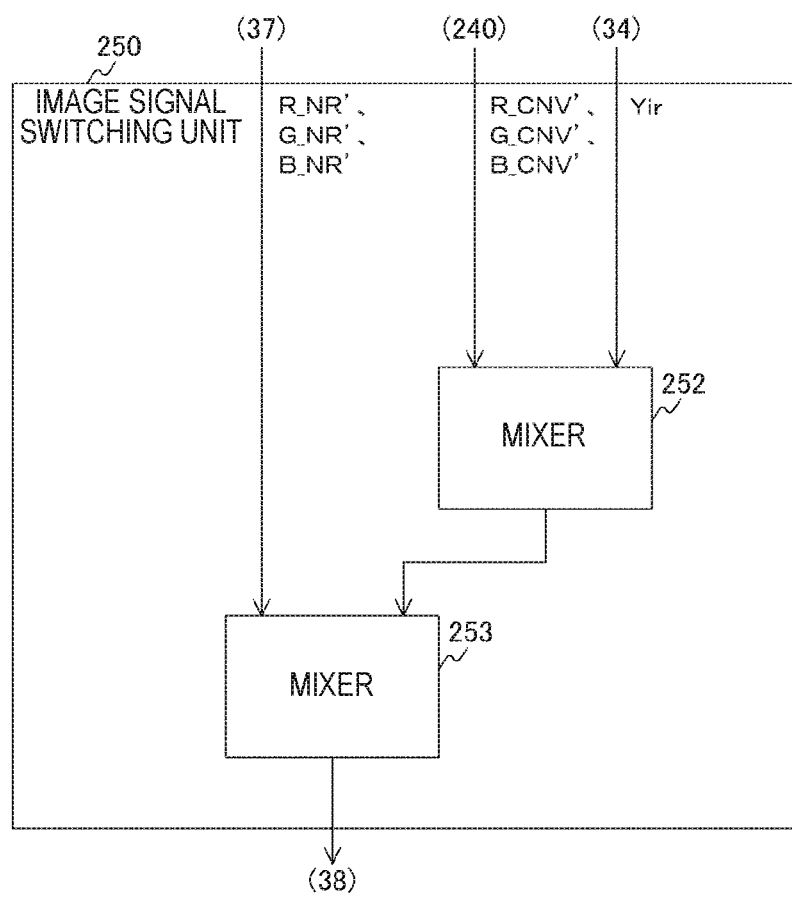
FIG. 10 is a diagram illustrating an exemplary configuration of an image signal switching unit 250 according to the first embodiment of the present technology.

FIG. 10 is a diagram illustrating an exemplary configuration of the image signal switching unit 250 according to the first embodiment of the present technology. The image signal switching unit 250 includes mixers 252 and 253.

The mixer 252 mixes the infrared light luminance signal Yir output from the separation unit 34 and the synthesized signals (R_CNV', G_CNV', and B_CNV') output from the high frequency signal interpolation unit 240 together. The mixture can be performed using alpha blending in a similar way to the mixer 236 described with reference to FIG. 8. Specifically, it can be done as follows. In a case where the image of the visible light frame is smaller than a predetermined illuminance, for example, 0.1 lux (lx), the ratio of the infrared light luminance signal Yir is set to a value "1.0". In a case where the image of the visible light frame has illuminance in the range of 0.1 to 0.5 lux, the mixer 252 performs the mixture by decreasing the ratio of the infrared light luminance signal Yir from the value "1.0" and increasing the ratio of the synthesized signal. In a case where the illuminance of the image of the visible light frame exceeds 0.5 lux, the mixer 252 sets the mixture ratio of the synthesized signal to the value "1.0". In this case, only the synthesized signal is output.

The mixer 253 mixes the image signal output from the mixer 252 and the visible light signals (R_NR', G_NR', and B_NR') output from the white balance adjuster 37 together. The mixer 253 outputs the image signal output from the mixer 252 in a case where the image of the visible light frame is smaller than a predetermined illuminance, for example, 8 lux. In a case where the illuminance of the image of the visible light frame is in the range of 8 to 10 lux, the image signal output from the mixer 252 and the visible light signal are mixed. In this case, the mixture is performed by gradually decreasing the mixture ratio of the image signal output from the mixer 252. In a case where the illuminance of the image of the visible light frame exceeds 10 lux, the mixer 253 outputs only the visible light signal.

These mixers 252 and 253 perform switching between image signals. Moreover, it is also possible to change the mixture ratio in mixing the image signals on the basis of the control of the controller 14 described with reference to FIG. 1.

[Creation of Mixture Ratio α1]

FIG. 11 is a diagram illustrating an example of the mixture ratio in the embodiment of the present technology. This figure illustrates an example of a conversion table used to create the mixture ratio α1 by the mixture ratio creator 234 described with reference to FIG. 8. This conversion table is used to convert the low frequency visible light signal and the low frequency invisible light signal into a mixture ratio. In this figure, the standardized low frequency visible light luminance signal Y_LF and the low frequency infrared light luminance signal Yir_LF are converted into the mixture ratio α1. Here, in a case where the low frequency visible light signal is smaller than a predetermined threshold, it is possible for the mixed signal to be made smaller than the low frequency invisible light signal by limiting the mixture ratio to a predetermined value. In the example of this figure, in a case where the low frequency visible light luminance signal Y_LF is smaller than a predetermined threshold, it is possible for the low frequency luminance signal that is the mixed signal to be made smaller than the low frequency invisible light signal by limiting the mixture ratio α1 to a predetermined value. In one example, as indicated by a range 411 in this figure, in a case where the predetermined threshold is set to a value "0.1" and the low frequency visible light luminance signal Y_LF is smaller than this threshold, the mixture ratio α1 can be limited to a predetermined value, for example, a value "0.25". This makes it possible to improve the visibility, thereby preventing the deterioration in image quality.

Further, it is also possible to create the mixture ratio on the basis of which of the low frequency visible light signal and the low frequency invisible light signal is larger. In the example of this figure, it is possible to create the mixture ratio on the basis of which of the low frequency visible light luminance signal Y_LF and the low frequency infrared light luminance signal Yir_LF is larger. In one example, in a case where the low frequency visible light luminance signal Y_LF is smaller than the low frequency infrared light luminance signal Yir_LF as shown in a region 412 (shaded region) in this figure, it is possible for the mixture ratio α1 to be set to approximately zero. In other words, it is possible for the mixture ratio of the low frequency invisible light signal to be set to approximately zero. This makes it possible to generate a low frequency luminance signal with improved color reproducibility, thereby preventing the deterioration in image quality.

Further, in one example, in a case where the low frequency visible light luminance signal Y_LF is larger than the low frequency infrared light luminance signal Yir_LF as shown in a region 413 (hatched region) in the figure, it is possible for the mixture ratio α1 to be set to 0.5. In other words, the ratio of the low frequency visible light signal and the low frequency invisible light signal can be made substantially equal. This makes it possible to prevent the deterioration in visibility when the low frequency visible light signal is saturated. In addition, the addition of the low frequency infrared light luminance signal Yir_LF having less noise component makes it possible to generate a low frequency luminance signal with less noise, thereby preventing the deterioration in image quality.

In this way, the creation of the mixture ratio α1 based on the low frequency visible light luminance signal Y_LF and the low frequency infrared light luminance signal Yir_LF makes it possible to improve the visibility and color reproducibility of the synthesized signal, thereby preventing the deterioration in image quality. Moreover, the method of creating the mixture ratio α1 is not limited to the above example. In one example, it is possible to use a function that outputs a mixture ratio α1 similar to that of the conversion table described with reference to this figure.

[Low Frequency Signal Generation Processing]

Figure 12:
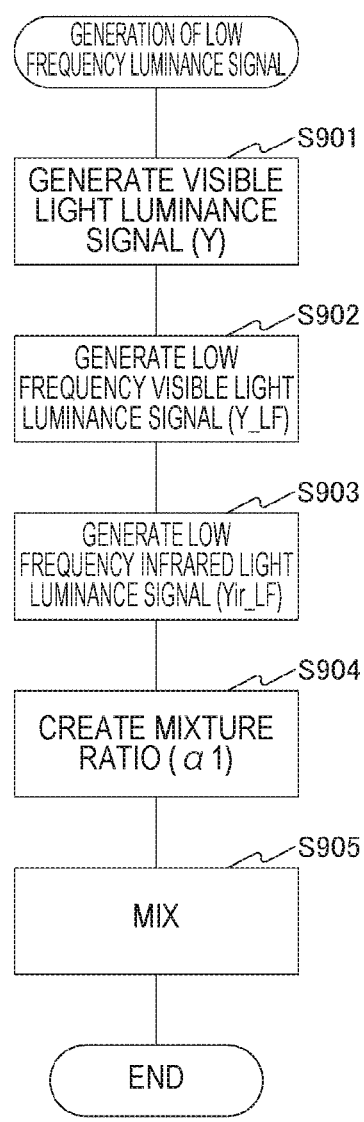
FIG. 12 is a diagram illustrating an example of a processing procedure of low frequency luminance signal generation processing according to an embodiment of the present technology.

FIG. 12 is a diagram illustrating an example of a processing procedure of low frequency luminance signal generation processing according to the embodiment of the present technology. The luminance and chrominance signal converter 221 generates a visible light luminance signal Y (step S901). Then, the low-pass filter #2 (223) generates the low frequency visible light luminance signal Y_LF (step S902). Then, the low-pass filter #3 (224) generates the low frequency infrared light luminance signal Yir_LF (step S903). Then, the mixture ratio creator 234 creates the mixture ratio α1 on the basis of the low frequency visible light luminance signal Y_LF and the low frequency infrared light luminance signal Yir_LF (step S904). Then, the mixer 236 mixes the low frequency visible light luminance signal Y_LF and the low frequency infrared light luminance signal Yir_LF together on the basis of the mixture ratio α1 (step S905), and generates a low frequency luminance signal.

In this way, according to the first embodiment of the present technology, the mixture ratio is created on the basis of the low frequency visible light luminance signal and the low frequency infrared light luminance signal. The low frequency visible light luminance signal and the low frequency infrared light luminance signal are mixed together on the basis of the mixture ratio to generate a low frequency synthesized signal. Thus, in a case where the value of the infrared light signal is larger than that of the visible light signal, it is possible to select a mixture ratio for improving color reproducibility. In addition, even in a case where only one of visible light or infrared light reaches a subject, it is possible to select an optimum luminance signal, thereby achieving high visibility.

Furthermore, according to the first embodiment of the present technology, when a high frequency visible light signal that is a high frequency component of a visible light signal and a high frequency invisible light signal that is a high frequency component of an invisible light signal are mixed together to interpolate a high frequency component, a signal having a large edge among them is selected. Alternatively, the mixture is performed by increasing the ratio of signals with a large edge among them. This makes it possible to achieve the visibility of a subject in the case where there is an edge in either visible light or infrared light.

2. SECOND EMBODIMENT

In the above-described embodiment, the high frequency component of the image signal is removed by the low-pass filter #1 (222) or the like. On the other hand, in a second embodiment of the present technology, the two-dimensional noise reduction units 35 and 36 remove the high frequency component. This makes it possible to simplify the configuration of the signal processor 13.

[Configuration of Synthesizer]

Figure 13:
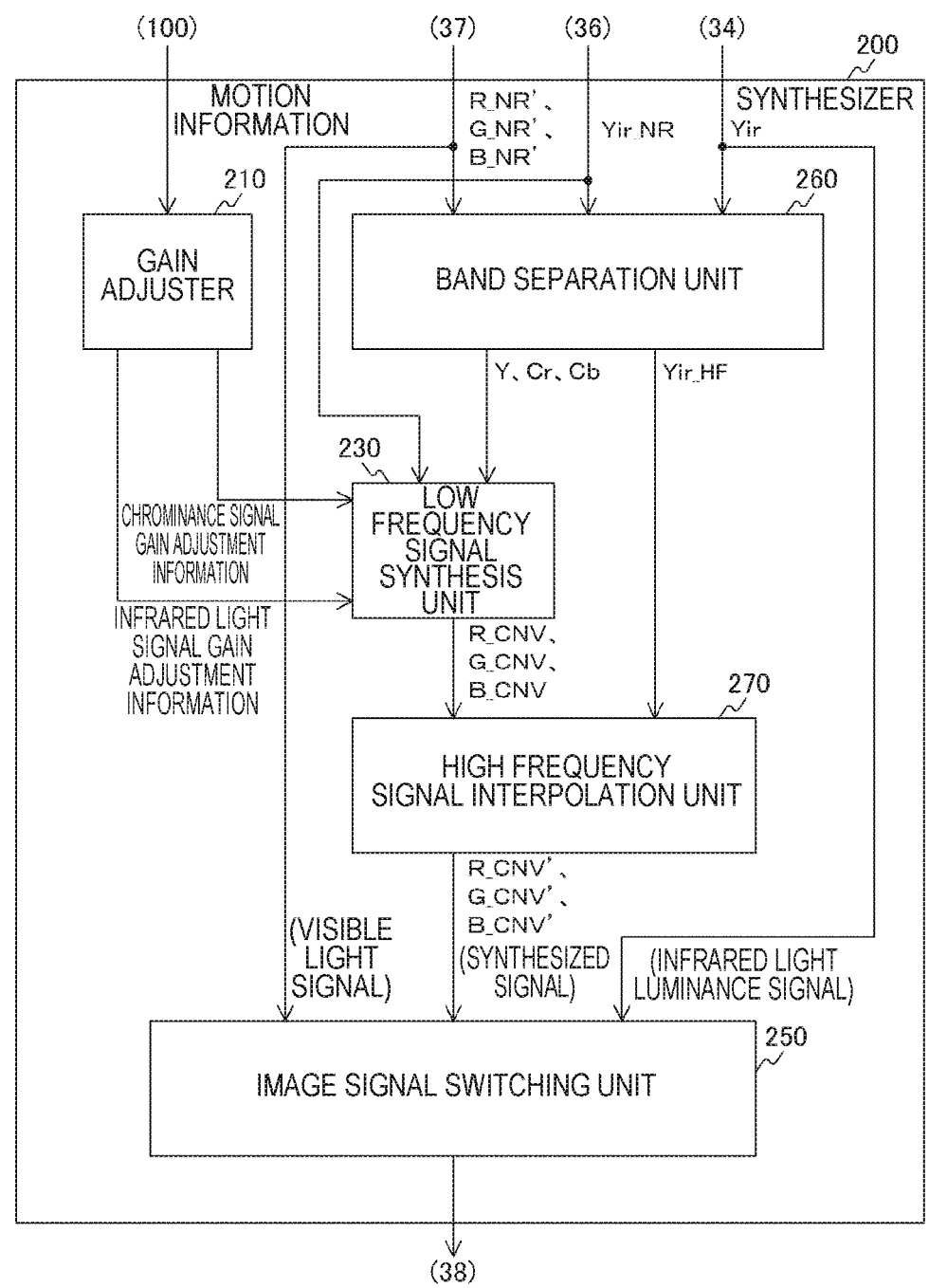
FIG. 13 is a diagram illustrating an exemplary configuration of a synthesizer 200 according to a second embodiment of the present technology.

FIG. 13 is a diagram illustrating an exemplary configuration of a synthesizer 200 according to the second embodiment of the present technology. The synthesizer 200 in this figure includes a band separation unit 260 and a high frequency signal interpolation unit 270, instead of the band separation unit 220 and the high frequency signal interpolation unit 240, respectively, which is different from the synthesizer 200 described with reference to FIG. 6. In addition, the low frequency signal synthesis unit 230 in this figure generates a low frequency synthesized signal from the luminance signal Y, the infrared light luminance signal Yir_NR output from the two-dimensional noise reduction unit 36, and the chrominance signals Cr and Cb. In other words, the signals Yir_NR, Y, Cr, and Cb in this figure correspond to the signals Yir_LF, Y_LF, Cr_LF, and Cb_LF in FIG. 6, respectively.

The band separation unit 260 outputs only the high frequency infrared light luminance signal Yir_HF to the high frequency signal interpolation unit 270. In addition, the band separation unit 260 outputs the visible light luminance signal Y and the chrominance signals Cr and Cb, instead of the low frequency visible light luminance signal Y_LF and the low frequency chrominance signals Cr_LF and Cb_LF, to the low frequency signal synthesis unit 230. Moreover, the infrared light luminance signal Yir_NR output from the two-dimensional noise reduction unit 36, instead of the low frequency infrared light luminance signal Yir_LF, is input to the low frequency signal synthesis unit 230. Moreover, in the second embodiment of the present technology, the two-dimensional noise reduction units 35 and 36 (as described with reference to FIG. 4) perform two-dimensional noise reduction processing for noise removal by removing a high frequency component of an image signal. Moreover, the two-dimensional noise reduction units 35 and 36 are examples of a noise reduction unit set forth in the claims.

[Configuration of Band Separation Unit]

Figure 14:
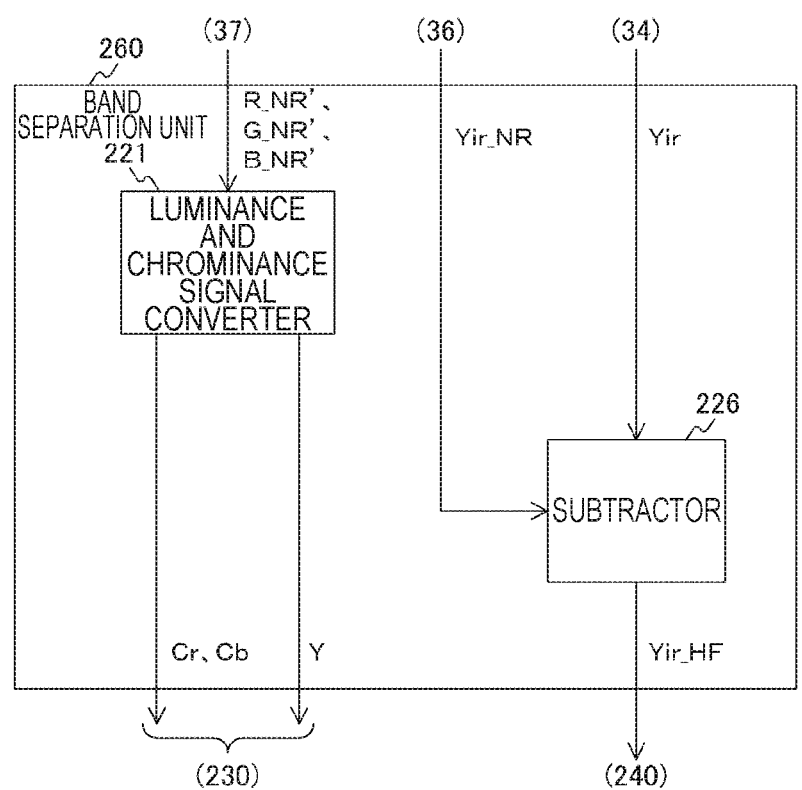
FIG. 14 is a diagram illustrating an exemplary configuration of a band separation unit 260 according to the second embodiment of the present technology.

FIG. 14 is a diagram illustrating an exemplary configuration of the band separation unit 260 according to the second embodiment of the present technology. The band separation unit 260 is not necessarily provided with the low-pass filters #1 (222) to #3 (224) and the subtractor #2 (226), which is different from the band separation unit 220 described with reference to FIG. 7. The subtractor 226 in this figure subtracts the infrared light luminance signal Yir_NR output from the two-dimensional noise reduction unit 36 from the infrared light luminance signal Yir output from the separation unit 34 to obtain the high frequency infrared light luminance signal Yir_HF. The luminance signal Y and the chrominance signals Cr and Cb generated by the luminance and chrominance signal converter 221 are output to the low frequency signal synthesis unit 230. In this way, the high frequency component of the image signal is removed in the two-dimensional noise reduction units 35 and 36, so it is possible to omit the low-pass filters #1 (222) to #3 (224).

[Configuration of High Frequency Signal Interpolation Unit]

Figure 15:
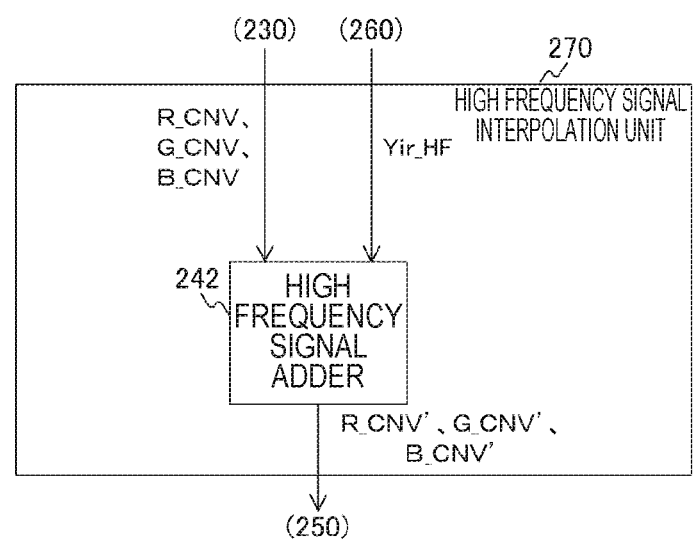
FIG. 15 is a diagram illustrating an exemplary configuration of a high frequency signal interpolation unit 270 according to the second embodiment of the present technology.

FIG. 15 is a diagram illustrating an exemplary configuration of the high frequency signal interpolation unit 270 according to the second embodiment of the present technology. The high frequency signal interpolation unit 270 is not necessarily provided with the high frequency signal generator 241, which is different from the high frequency signal interpolation unit 240 described with reference to FIG. 9. The high frequency signal adder 242 in this figure adds the low frequency synthesized signals (R_CNV, G_CNV, and B_CNV) output from the low frequency signal synthesis unit 230 to the high frequency infrared light luminance signal Yir_HF output from the band separation unit 260. Moreover, the interpolation of the high frequency signal described above may be omitted when noise reduction processing of a system in which the edge portion of the image is preserved in the three-dimensional noise reduction unit 100 and the two-dimensional noise reduction units 35 and 36 is performed.

The other configurations of the imaging device 10 is similar to the configuration of the imaging device 10 described in the first embodiment of the present technology, the description thereof will be omitted.

In this way, according to the second embodiment of the present technology, the use of the two-dimensional noise reduction units 35 and 36 for removing the high frequency component of the image signal makes it possible to omit the low-pass filters #1 (222) to #3 (224), simplifying the configuration of the signal processor 13.

<Modification>

In the above-described embodiment, the signal generated by performing the demosaicing on the W+IR signal is processed as the infrared light luminance signal Yir, but the image signal (IR signal) corresponding to the infrared light may be processed as the infrared light luminance signal Yir. This allows the present technology to be applicable even to a case of employing the image sensor 12 that does not include W+IR pixel. In one example, this case corresponds to a case of employing the image sensor 12 including a red pixel (R pixel) corresponding to red light, a green pixel (G pixel) corresponding to green light, a blue pixel (B pixel) corresponding to blue light, and an infrared light pixel (IR pixel) corresponding to infrared light. In this case, the mixture ratio α1 is created on the basis of the low frequency visible light signal that is the low frequency component of the visible light signals (R, G, and B signals) generated by the R, G and B pixels and the low frequency infrared light signal that is the low frequency component of the infrared light signal (IR signal). It is possible to mix the low frequency visible light signal and the low frequency infrared light signal together on the basis of the created mixture ratio α1. Moreover, the creation of the mixture ratio α1 can be performed using the method described with reference to FIG. 11.

Moreover, an example of the image sensor 12 can include complementary metal oxide semiconductor (CMOS) and charge coupled device (CCD) image sensors. In addition, FIG. 3 is based on the assumption that the rolling shutter image sensor 12 is used, but it is also possible to use a global shutter image sensor. Furthermore, light other than infrared light, for example, ultraviolet light can be processed as an invisible light signal.

The other configurations of the imaging device 10 is similar to the configuration of the imaging device 10 described in the first embodiment of the present technology, the description thereof will be omitted.

As described above, in the embodiment of the present technology, the mixture ratio is created on the basis of the low frequency visible light signal and the low frequency infrared light signal, and the low frequency visible light signal and the low frequency infrared light signal are mixed on the basis of the mixture ratio, thereby generating the image signal. Thus, in the case where the image signal is generated by mixing the visible light signal and the infrared light signal together while applying infrared light, it is possible to prevent deterioration in image quality of the generated image signal.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a compact disc (CD), a mini disc (MD), and a digital versatile disc (DVD), a memory card, and a Blu-ray disc (registered trademark) can be used.

Note that the effects described in the present specification are not necessarily limited, and any effect described in the present disclosure may be exhibited.

Additionally, the present technology may also be configured as below.

(1)
A signal processing device including:
a mixture ratio creator configured to create a mixture ratio that is a ratio in mixing a low frequency visible light signal that is a low frequency component of a visible light signal and a low frequency invisible light signal that is a low frequency component of an invisible light signal together on a basis of the low frequency visible light signal and the low frequency invisible light signal; and
a mixer configured to mix the low frequency visible light signal and the low frequency invisible light signal together on a basis of the mixture ratio to generate a mixed signal.

(2)
The signal processing device according to (1),
in which the mixture ratio creator creates the mixture ratio on a basis of which of the low frequency visible light signal and the low frequency invisible light signal is larger.

(3)
The signal processing device according to (2),
in which the mixture ratio creator creates the mixture ratio at which a ratio of the low frequency invisible light signal in the mixing is set to approximately zero in a case where the low frequency visible light signal is smaller than the low frequency invisible light signal.

(4)
The signal processing device according to (2),
in which the mixture ratio creator creates the mixture ratio at which ratios of the low frequency visible light signal and the low frequency invisible light signal in the mixing are made substantially equal to each other in a case where the low frequency visible light signal is larger than the low frequency invisible light signal.

(5)
The signal processing device according to (1),
in which the mixture ratio creator limits the mixture ratio to a predetermined value so that the mixed signal is smaller than the low frequency invisible light signal in a case where the low frequency visible light signal is smaller than a predetermined threshold.

(6)
The signal processing device according to any one of (1) to (5), further including:
a high frequency signal adder configured to add a high frequency invisible light signal that is a high frequency component of the invisible light signal to the mixed signal.

(7)
The signal processing device according to (6),
in which the high frequency signal adder adds a high frequency visible light signal that is a high frequency component of the visible light signal and the high frequency invisible light signal to the mixed signal.

(8)
The signal processing device according to any one of (1) to (7), further including:
a visible light signal filter configured to generate the low frequency visible light signal from the visible light signal; and
an invisible light signal filter configured to generate the low frequency invisible light signal from the invisible light signal,
in which the mixture ratio creator creates the mixture ratio based on the generated low frequency visible light signal and the generated low frequency invisible light signal, and
the mixer mixes the generated low frequency visible light signal and the generated low frequency invisible light signal together.

(9)
The signal processing device according to (8),
in which the visible light signal filter includes a low-pass filter.

(10)
The signal processing device according to (8),
in which the invisible light signal filter includes a low-pass filter.

(11)
The signal processing device according to (8),
in which the visible light signal filter includes a noise reduction unit configured to remove noise of the visible light signal.

(12)
The signal processing device according to (8),
in which the invisible light signal filter includes a noise reduction unit configured to remove noise of the invisible light signal.

(13)
The signal processing device according to any one of (1) to (12),
in which the low frequency visible light signal is a low frequency visible light luminance signal that is a low frequency component of a visible light luminance signal,
the mixture ratio creator creates the mixture ratio on a basis of the low frequency visible light luminance signal and the low frequency invisible light signal, and
the mixer mixes the low frequency visible light luminance signal and the low frequency invisible light signal together.

(14)
The signal processing device according to any one of (1) to (13),
in which the low frequency invisible light signal is a low frequency infrared light signal that is a low frequency component of an infrared light signal corresponding to infrared light.

(15)
An imaging device including:
an image sensor configured to generate a visible light signal and an invisible light signal;
a mixture ratio creator configured to create a mixture ratio that is a ratio in mixing a low frequency visible light signal that is a low frequency component of the generated visible light signal and a low frequency invisible light signal that is a low frequency component of the generated invisible light signal together on a basis of the low frequency visible light signal and the low frequency invisible light signal; and
a mixer configured to mix the low frequency visible light signal and the low frequency invisible light signal together on a basis of the mixture ratio to generate a mixed signal.

(16)
A signal processing method including:
a mixture ratio creation step of creating a mixture ratio that is a ratio in mixing a low frequency visible light signal that is a low frequency component of a visible light signal and a low frequency invisible light signal that is a low frequency component of an invisible light signal together on a basis of the low frequency visible light signal and the low frequency invisible light signal; and
a mixing step of mixing the low frequency visible light signal and the low frequency invisible light signal together on a basis of the mixture ratio to generate a mixed signal.

REFERENCE SIGNS LIST 10 imaging device
11 lens
12 image sensor 13 signal processor
14 controller
15 infrared light irradiator
31, 32 demosaicing unit
33, 34 separation unit
35, 36 two-dimensional noise reduction unit
37 white balance adjuster
38 correction unit
39, 221 luminance and chrominance signal converter
100 three-dimensional noise reduction unit
110, 130 frame memory
120 visible light frame noise reduction unit
140 infrared light irradiation frame noise reduction unit
200 synthesizer
210 gain adjuster
220, 260 band separation unit
222 to 224 low-pass filter
226, 226 subtractor
230 low frequency signal synthesis unit
231 chrominance signal level converter
232 image signal converter
234 mixture ratio creator
236 mixer
237 infrared light signal gain adjuster
240, 270 high frequency signal interpolation unit
241 high frequency signal generator
242 high frequency signal adder
250 image signal switching unit
252, 253 mixer
401 pixel

The invention claimed is:

1. A signal processing device, comprising:
a mixture ratio creator configured to create a mixture ratio that is a ratio in mixing a low frequency visible light signal that is a low frequency component of a visible light signal and a low frequency invisible light signal that is a low frequency component of an invisible light signal together on a basis of the low frequency visible light signal and the low frequency invisible light signal; and
a mixer configured to mix the low frequency visible light signal and the low frequency invisible light signal together on a basis of the mixture ratio to generate a mixed signal.

2. The signal processing device according to claim 1, wherein the mixture ratio creator is further configured to create the mixture ratio on a basis of which of the low frequency visible light signal and the low frequency invisible light signal is larger.

3. The signal processing device according to claim 2, wherein the mixture ratio creator is further configured to create the mixture ratio at which a ratio of the low frequency invisible light signal in the mixing is set to approximately zero in a case where the low frequency visible light signal is smaller than the low frequency invisible light signal.

4. The signal processing device according to claim 2, wherein the mixture ratio creator is further configured to create the mixture ratio at which ratios of the low frequency visible light signal and the low frequency invisible light signal in the mixing are made substantially equal to each other in a case where the low frequency visible light signal is larger than the low frequency invisible light signal.

5. The signal processing device according to claim 1, wherein the mixture ratio creator is further configured to limit the mixture ratio to a predetermined value so that the mixed signal is smaller than the low frequency invisible light signal in a case where the low frequency visible light signal is smaller than a predetermined threshold.

6. The signal processing device according to claim 1, further comprising:
a high frequency signal adder configured to add a high frequency invisible light signal that is a high frequency component of the invisible light signal to the mixed signal.

7. The signal processing device according to claim 6, wherein the high frequency signal adder is further configured to add a high frequency visible light signal that is a high frequency component of the visible light signal and the high frequency invisible light signal to the mixed signal.

8. The signal processing device according to claim 1, further comprising:
a visible light signal filter configured to generate the low frequency visible light signal from the visible light signal; and
an invisible light signal filter configured to generate the low frequency invisible light signal from the invisible light signal,
wherein the mixture ratio creator is further configured to create the mixture ratio based on the generated low frequency visible light signal and the generated low frequency invisible light signal, and
the mixer is further configured to mix the generated low frequency visible light signal and the generated low frequency invisible light signal together.

9. The signal processing device according to claim 8, wherein the visible light signal filter includes a low-pass filter.

10. The signal processing device according to claim 8, wherein the invisible light signal filter includes a low-pass filter.

11. The signal processing device according to claim 8, wherein the visible light signal filter includes a noise reduction unit configured to remove noise of the visible light signal.

12. The signal processing device according to claim 8, wherein the invisible light signal filter includes a noise reduction unit configured to remove noise of the invisible light signal.

13. The signal processing device according to claim 1, wherein the low frequency visible light signal is a low frequency visible light luminance signal that is a low frequency component of a visible light luminance signal,
the mixture ratio creator is further configured to create the mixture ratio on a basis of the low frequency visible light luminance signal and the low frequency invisible light signal, and
the mixer is further configured to mix the low frequency visible light luminance signal and the low frequency invisible light signal together.

14. The signal processing device according to claim 1, wherein the low frequency invisible light signal is a low frequency infrared light signal that is a low frequency component of an infrared light signal corresponding to infrared light.

15. An imaging device, comprising:
an image sensor configured to generate a visible light signal and an invisible light signal;
a mixture ratio creator configured to create a mixture ratio that is a ratio in mixing a low frequency visible light signal that is a low frequency component of the generated visible light signal and a low frequency invisible light signal that is a low frequency component of the generated invisible light signal together on a basis of the low frequency visible light signal and the low frequency invisible light signal; and a mixer configured to mix the low frequency visible light signal and the low frequency invisible light signal together on a basis of the mixture ratio to generate a mixed signal.

16. A signal processing method, comprising:

a mixture ratio creation step of creating a mixture ratio that is a ratio in mixing a low frequency visible light signal that is a low frequency component of a visible light signal and a low frequency invisible light signal that is a low frequency component of an invisible light signal together on a basis of the low frequency visible light signal and the low frequency invisible light signal; and a mixing step of mixing the low frequency visible light signal and the low frequency invisible light signal together on a basis of the mixture ratio to generate a mixed signal.

* * * * *